Patented Aug. 14, 1923.

1,464,598

UNITED STATES PATENT OFFICE.

LLOYD C. DANIELS, OF BUFFALO, NEW YORK, ASSIGNOR TO NATIONAL ANILINE & CHEMICAL COMPANY, INC., OF NEW YORK, N. Y., A CORPORATION OF NEW YORK.

PRODUCTION OF VAT DYESTUFFS.

No Drawing. Application filed March 29, 1923. Serial No. 628,564.

*To all whom it may concern:*

Be it known that I, LLOYD C. DANIELS, a citizen of the United States, residing at Buffalo, in the county of Erie, State of New York, have invented certain new and useful Improvements in the Production of Vat Dyestuffs; and I do hereby declare the following to be a full, clear, and exact description of the invention, such as will enable others skilled in the art to which it appertains to make and use the same.

This invention relates to improvements in the manufacture and production of vat dyestuffs and more particularly to such as are produced by the action of nitrating agents on dibenzanthrone.

In the production of dibenzanthrone (also called violanthrone, and known commercially as indanthrene dark blue BO) by the action of fused caustic potash on benzanthrone, there is produced a composite product which is made up in part of a vatable dye and in part of a non-vatable by-product, the later being insoluble or difficultly soluble in alkaline sodium hydrosulfite solution. The specification of the application for Letters Patent, Serial No. 486,195, filed July 7, 1921, describes an invention in which the purification of crude dibenzanthrone and its separation into a vatable dye and a non-vatable by-product is effected by treating crude dibenzanthrone, or the melt obtained by fusing benzanthrone with caustic potash, with an alkaline sodium hydrosulfite solution, separating the solution of vatable dye from the undissolved by-product, and precipitating the vatable dye from solution by means of aeration or other suitable means. The precipitated dye is then collected by filtration, washed and dried, or, if preferred, made up to any desired concentration of paste.

It has been hitherto proposed to treat crude dibenzanthrone with nitric acid in the presence of glacial acetic acid for the production of coloring matters known commercially as indanthrene green B (also known chemically as nitrodibenzanthrone or as nitroviolanthrone).

I have found by treating with nitric acid a dibenzanthrone which has been freed from impurities insoluble in alkaline hydrosulfite solution, for example, by the process of application, Serial No. 486,195 mentioned above, that crude coloring matters can be obtained which, without purification, are completely soluble, or substantially so, in alkaline sodium hydrosulfite solution giving a vat which dyes vegetable fibres bluish shades which upon exposure to air produce bluish-green to yellowish green shades which are considerably brighter than the shades produced by the dyestuff which has been made by the nitration of crude dibenzanthrone. Further, I have found that not only is the quality of the dyestuff superior but that the strength of the dyestuff, on the dry basis, is approximately 50 to 100 per cent greater than the crude dyestuff produced by nitrating crude dibenzanthrone.

I have also found that the impurities insoluble in alkaline hydrosulfite solution, unless removed from the crude dibenzanthrone, also react with nitric acid, not only giving nitrated impurities in the product, but requiring additional nitric acid for their nitration; and that when such impurities are previously removed, the nitration of the purified dibenzanthrone can be carried to the required degree with a considerably less amount of nitric acid.

I have further found that the nitration of the purified dibenzanthrone can advantageously be carried out with the use of nitrobenzene as the suspending or diluting medium or solvent and that its use presents material advantages over the use of glacial acetic acid, giving more desirable shades in the product.

In carrying out the present invention, I subject a dibenzanthrone which is free from impurities insoluble in alkaline hydrosulfite liquors to the action of nitric acid or other nitrating agent in the presence of nitrobenzene. When the reaction is complete, the mixture is neutralized and the nitrobenzene removed by steam distillation or otherwise. The product in the residual liquor is then filtered off, washed and either dried or kept as paste.

The invention will be further illustrated by the following specific example, but it will be understood that the invention is not limited thereto.

Example: Gradually add, with stirring, 50 lbs. of dibenzanthrone which is free from impurities which are insoluble in alkaline sodium hydrosulfite liquors, and obtainable, for example, as more fully described in the specification of the application for Letters Patent, Serial No. 486,195, filed July 7, 1921, to 300 lbs. nitrobenzene at a temperature of 50°–60° C., and then slowly introduce into the well-stirred mixture 40 lbs. of nitric acid of 80 per cent strength (that is, about 1.46 sp. gr.). The addition of the acid usually requires 1½ to 2 hours. After the acid has been added, heat the mixture for a further period of 2–3 hours, maintaining the temperature of the mixture at 50°–60° C. The mixture is then cooled to 20°–25° C. and solid soda ash added, while stirring, in an amount somewhat more than sufficient to neutralize the acid present. About 300 lbs. of hot water are then added and the nitrobenzene removed by distillation in a current of steam. The product is filtered from the residual liquor, washed with hot water until substantially free from alkali, and it is then either dried or kept as paste, as desired.

Instead of removing the nitrobenzene by steam distillation it may be removed by filtration and the dyestuff washed first with a little acetic acid or alcohol or benzene and then with hot water, and finally dried. The recovered nitrobenzene may be used over again in the process.

The dyestuff thus obtained, in the dry state, is a dark purplish powder which is substantially completely soluble in alkaline hydrosulfite liquors giving a vat which dyes vegetable fibre brighter shades of greatly increased strength as compared with the dye, weight for weight, produced by treating with nitric acid crude dibenzanthrone, that is, dibenzanthrone from which the impurities insoluble in alkaline hydrosulfite liquors have not been removed. Further, the dyestuff in the form of paste produced in the present invention keeps better in that it does not tend to settle out so much as does the dyestuff produced by nitrating the unpurified dibenzanthrone.

It is understood that the invention is not confined to the particulars given in the above example. For example, the relative proportions of the interacting substances, and the time and the temperature, as well as the amount of nitrobenzene employed, may be somewhat varied. Generally speaking, the more energetic or the more complete the nitration of the purified dibenzanthrone the more the coloring matters produced tend to give shades passing from bluish-green to yellowish-green. The action of a weaker nitric acid over a longer period of time is, within limits, more or less equivalent to that of a stronger acid for a shorter period of time. The amount of nitrobenzene employed may be either increased or decreased without harmful effects. Further, a dibenzanthrone which has been further purified by extraction with dichlorbenzene or other solvents, or one which has been crystallized from a solvent, can be employed for nitration.

It may be pointed out that the dyestuff produced by the present invention may be reduced by the action of suitable reducing agents, such as sodium sulfide, giving rise to products which can be dyed from a vat in the same manner as the unreduced dyestuff. Further, the dyestuff on the fibre in either case may be after-treated with an appropriate oxidizing agent such as sodium hypochlorite, and there are produced gray to black to greenish-black shades fast to light.

It may be further pointed out that other coloring-matters containing a dibenzanthrone group may be purified by removing such impurities as are insoluble in alkaline hydrosulfite liquors and the purified coloring-matters thus obtained subjected to the action of nitric acid or other nitrating agent in a manner similar to that of the present invention.

It will thus be seen that the process of the present invention produces dyestuffs of greater strength and purity, and give brighter shades, than dyestuffs heretofore produced by treating crude dibenzanthrone, or other crude compounds containing a dibenzanthrone group, with nitric acid. It will be further seen that the invention includes an economic advantage by employing a considerably less amount of nitric acid (about one-third to one-fourth as much) than that hitherto proposed. The time of the reaction is also considerably less.

I claim:

1. The process of making coloring-matters which comprises treating with a nitrating agent a dibenzanthrone body which is free from impurities insoluble in alkaline hydrosulfite liquors.

2. The process of making coloring-matters which comprises treating with nitric acid a dibenzanthrone body free from impurities insoluble in alkaline hydrosulfite liquors.

3. The process of making coloring-matters which comprises treating with nitric acid in the presence of nitrobenzene a dibenzanthrone body free from impurities insoluble in alkaline hydrosulfite liquors.

4. The process of making coloring-matters which comprises treating dibenzanthrone free from impurities insoluble in alkaline hydrosulfite liquors with nitric acid.

5. The process of making coloring-matters which comprises subjecting dibenzanthrone free from impurities insoluble in alkaline sodium hydrosulfite solution to the action of nitric acid in the presence of nitrobenzene.

6. The process of making coloring-matters which comprises treating 50 parts of dibenzanthrone, free from impurities insoluble in alkaline hydrosulfite liquor, with 40 parts of nitric acid of about specific gravity 1.46 in the presence of 300 parts of nitrobenzene at a temperature of 50°-60° C., neutralizing the excess acid with soda ash, removing the nitrobenzene by steam distillation and collecting the dyestuff by filtration.

7. As new products, the coloring-matters obtainable by treating dibenzanthrone free from impurities insoluble in alkaline hydrosulfite liquors with nitric acid in the presence of nitrobenzene, which coloring matters in the dry state are dark purple powders insoluble in water and in dilute acids and alkalies but which are substantially completely soluble in alkaline hydrosulfite solution yielding bluish vats which dye vegetable fibre shades which on exposure to air become bluish- to yellowish-green.

8. As new products, the coloring-matters obtainable by treating a dibenzanthrone body free from impurities insoluble in alkaline hydrosulfite liquors with nitric acid in the presence of nitrobenzene, which coloring matters in the dry state are dark purple powders insoluble in water and in dilute acids and alkalies but which are substantially completely soluble in alkaline hydrosulfite solution yielding bluish vats which dye vegetable fibre shades which on exposure to air become bluish- to yellowish-green.

In testimony whereof I affix my signature.

LLOYD C. DANIELS.